United States Patent [19]
Bae

[11] Patent Number: 5,350,991
[45] Date of Patent: Sep. 27, 1994

[54] MAGNETIC INDUCTION METHOD AND MAGNETIC CIRCUIT OF ROTATOR FOR GENERATING MECHANICAL AND ELECTRIC POWER

[76] Inventor: Youn S. Bae, 603-1, Anyang-dong, Anyang-si, Kyungki-do, Rep. of Korea

[21] Appl. No.: 910,074

[22] PCT Filed: Jul. 20, 1990

[86] PCT No.: PCT/KR90/00007
§ 371 Date: Aug. 17, 1992
§ 102(e) Date: Aug. 17, 1992

[87] PCT Pub. No.: WO91/11051
PCT Pub. Date: Jul. 25, 1991

[30] Foreign Application Priority Data

Jan. 12, 1990 [KR] Rep. of Korea ............... 90-382

[51] Int. Cl.⁵ ............... H02K 47/20; H02K 47/00; H02K 57/00
[52] U.S. Cl. ............... 318/727; 318/138; 318/254; 310/186; 310/187
[58] Field of Search ............... 318/701–730, 318/138, 254, 696; 310/106, 126, 133, 134, 140, 141, 142, 144, 145, 149, 179, 180, 184, 185, 186, 187, 257

[56] References Cited

U.S. PATENT DOCUMENTS

| | | |
|---|---|---|
| 588,491 | 8/1897 | Short . |
| 2,378,668 | 6/1945 | Vickers . |
| 3,885,302 | 5/1975 | Boesel ............... 310/186 X |
| 4,005,347 | 1/1977 | Erdman ............... 318/254 |
| 4,220,882 | 9/1980 | Kohzai et al. ............... 310/186 |
| 4,228,396 | 10/1980 | Palombo et al. ............... 318/272 |
| 4,282,464 | 8/1981 | Uzuka ............... 318/138 |
| 4,307,312 | 12/1981 | Kohzai et al. ............... 310/186 |
| 4,338,535 | 7/1982 | Kohzai et al. ............... 310/186 |
| 4,346,335 | 8/1982 | McInnis ............... 310/187 |
| 4,360,769 | 11/1982 | Selkey et al. ............... 318/601 |
| 4,374,337 | 2/1983 | Kohzai et al. ............... 310/186 |
| 4,631,456 | 12/1976 | Drescher . |
| 4,642,539 | 2/1987 | Hinds ............... 318/439 |
| 4,712,028 | 12/1987 | Horber ............... 310/154 |
| 4,982,123 | 1/1991 | Raad ............... 318/158 |
| 5,122,697 | 6/1992 | Horst ............... 310/181 |
| 5,124,606 | 6/1992 | Eisenbeis ............... 310/114 |
| 5,173,651 | 12/1992 | Buckley et al. ............... 318/701 |
| 5,194,794 | 3/1993 | Shamoto ............... 318/603 |

FOREIGN PATENT DOCUMENTS

| | | |
|---|---|---|
| 90845 | 1/1923 | Austria . |
| 2733719 | 2/1979 | Fed. Rep. of Germany . |
| 2734223 | 2/1979 | Fed. Rep. of Germany . |

Primary Examiner—Paul Ip
Attorney, Agent, or Firm—Ladas & Parry

[57] ABSTRACT

A magnetic circuit for generating the mechanical power and the electric power comprises a rotator (10) in a mechanic dynamic power generation device, an electric power generation device and a magnetic flux circulation induction device. The rotator generates a mechanical revolving force by using the electric energy and also convert the mechanical revolving force into the electric energy again, particularly to the rotator in which the mechanic energy can be obtained by using the attractive and repulsive force of the magnetic flux after the electric energy is converted into the magnetic energy when the revolving force is obtained from the electric energy and the magnetic circuit, and the magnetic induction method that the magnetic flux of a revolving field magnet (2) is induced to armatures (3, 4) by the mechanic energy and converted into the electric energy by crossing the coils (3c) wound around slots (3a, 3b) on the armatures (3, 4).

12 Claims, 5 Drawing Sheets

MAGNETIC INDUCTION METHOD AND MAGNETIC CIRCUIT OF ROTATOR FOR GENERATING MECHANICAL AND ELECTRIC POWER

FIELD OF THE INVENTION

The present invention relates to a rotator for generating mechanical and electric power, in which the mechanical revolving force is generated by using the electric energy and also converted into the electric energy again. And more particularly, the present invention relates to a rotator, in which the mechanical energy can be obtained by taking advantage of the attractive and repulsive force of magnetic flux after the electric energy is converted into the magnetic energy. In other words, the revolving force is obtained from the magnetic circuit of a rotator for generating mechanical and electric power and a magnetic induction method in which the magnetic flux of a revolving field magnet is induced to armatures by the mechanical energy and converted into the electric energy by crossing the magnetic flux of coils wound around the armatures.

DESCRIPTION OF THE ART

As a conventional rotator, there are motors for generating the revolving force by receiving the electric energy, electric generators for generating the electric energy by receiving the mechanical energy, motor dynamos connected mechanically to the motor and the electric generator, and dynamotors comprising input wound coil of an armature applied for the motor and output wound coils applied for the electric generator.

The magnetic circuit of the rotator according to the present invention is different from that of the motor or the electric generator in the view point that magnetic pole sides generate simultaneously the mechanical power and the electric power by receiving the external electric energy.

Also, the magnetic circuit of the present invention is different from that of the motor dynamo in the view point that the apparatus for generating the mechanical and the electric power comprises one magnetic circuit. Moreover, the magnetic circuit of the present invention is different from that of the dynamotor in the view point that armatures for a mechanical power generator and an electric power generator are, made at the magnetic pole sides respectively.

Thus, the magnetic circuit of the rotator in the present invention has different characteristics from that of the conventional rotator in the view point of its faculty and structure.

The magnetic circuit of the present invention can reduce extremely the consumption of the electric power since the mechanical and the electric power are generated simultaneously and the generated electric power in the armatures can be restored to the electric power for the rotator.

SUMMARY OF THE INVENTION

It is an object of the present invention to provide a magnetic circuit of a rotator which can obtain the mechanical revolving force by the external electric power and the electric energy by inducing the magnetic flux to the armatures using the mechanical energy again.

Another object of the present invention is to provide a magnetic induction method which converts the mechanical energy into the electric energy by inducing the magnetic flux to the rotator for generating the mechanical and the electric power.

According to the present invention, there is provided a magnetic circuit of a rotator for generating the electric power and the mechanical power, comprising: a revolving field magnet for rotating by the attractive and repulsive forces of a magnetic field; means for generating the mechanical power to apply a rotating magnetic field to said revolving field magnet, including one or more armatures wound with coils and a plurality of conductors of slot-type at the magnetic poles thereof for generating the mechanical power; means for generating the electric power formed by conductors, including one or more armatures for generating the electric power to receive a magnetic flux generated when said revolving field magnet rotates and coils wound around said armatures for generating the electric power; magnetic flux induction means including one or more induction electromagnets for control the flow of a magnetic flux according to the position of said revolving field magnet and a circulation conduction for circulating an inducted flux by said induction electromagnets.

Also, a magnetic induction method of a magnetic circuit in the rotator for generating the mechanical and the electric power is provided.

DESCRIPTION OF THE PREFERRED EMBODIMENTS

The present invention will be now described in more detail with reference to the accompanying drawings.

Figure 1:
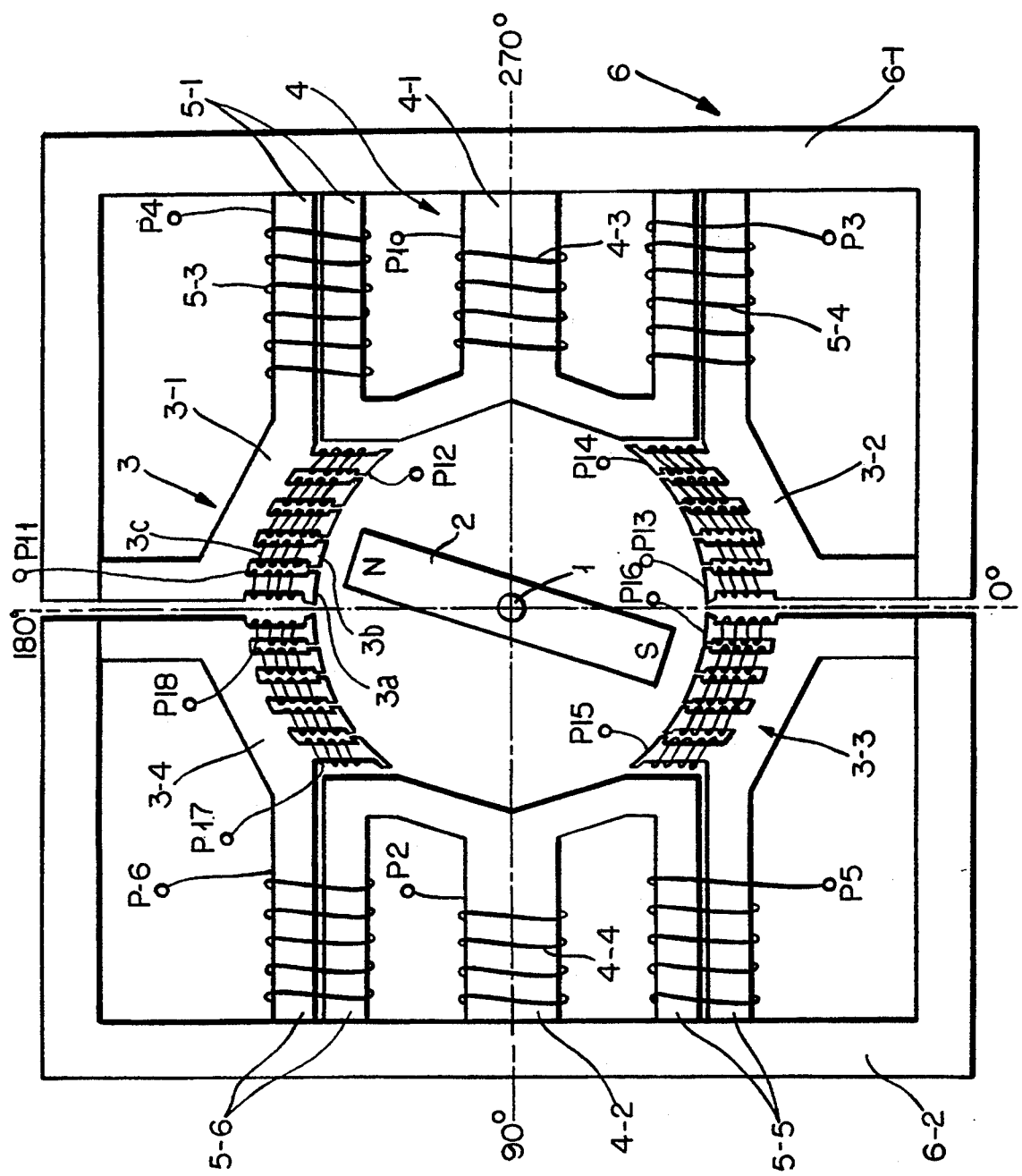
FIG. 1 is a plan view illustrating a magnetic circuit of a rotator basically according to the present invention.

FIG. 1 is a basically illustrated plan view of a rotator according to the present invention.

The rotator according to the present invention is largely divided into three components; mechanical power generation means, electric power generation means, and magnetic flux circulation induction means.

A revolving field magnet 2 fixed at a rotation axis 1 is located in the middle of the all means. The revolving field magnet 2 is made of a electromagnet to be magnetized by current, or a permanent magnet. The mechanical power generation means comprises the revolving field magnet 2 and one or more armatures 3 for generating the mechanical power. At a plurality of magnetic pole sides of the armatures 3 for generating the mechanical power, many conductors of slot type 3a and 3b are formed being insulated and coils 3c are wound for applying a magnetic field to the revolving field magnet 2. The armatures 3 for generating the mechanical power comprise a first armature 3-1, a second armature 3-2, a third armature 3-3, and a fourth armature 3-4 which have the same and symmetric structure.

The electric power generation means comprises the revolving field magnet 2 and one or more armatures 4 for generating the electric power by receiving magnetic flux during the rotation of the revolving field magnet 2. At a plurality of magnetic pole sides of the armatures 4 for generating the electric power many conductors are formed of slot or plane type and also wound by coils 4-3 for generating the electric power. The armatures 4 for generating the electric power comprise a first armature 4-1 and a second armature 4-2.

The magnetic flux circulation induction means is formed of one body not only with the armatures 3 for generating mechanical power but also with the armatures 4 for generating electric power. In the magnetic flux circulation induction means, electromagnets 5 are formed of a ferromagnetic material such as both armatures 3 and 4 for generating the mechanical and connected with each through wound coils 5-3 and 5-4. The induction electromagnets 5 for circulating the induced magnetic flux comprise a first to a fourth induction electromagnets 5-1, 5-2, 5-5 and 5-6. The induction electromagnets 5 can be formed into various shape of bar, triangle, circle, prominence and depression, T, H, or Y-type. Also, the magnetic flux circulation induction means includes circulation conductors 6 for circulating the induced magnetic flux at the induction electromagnets 5. The circulation conductors 6 are made of the ferromagnetic material and comprise a first conductor 6-1 and a second conductor 6-2.

As above, the revolving field magnet 2 has a symmetric structure of the same left and right sides of the rotation axis 1

If we observe only the right side, a coil 4-3 wound around an armature 4-1 for generating the electric power, which is included in the electric power generation means, is taken out as an input P1 and the electromotive force is generated through the coil 4-3 when the magnetic flux is crossed thereto.

Also, a first and a second induction electromagnets 5-1 and 5-2 for circulating the magnetic flux are included in the magnetic flux induction means and wound with coils 5-3 and 5-4 in a constant direction, so that an identical magnetic field is formed and a pair of input lines P3 and P4 are are taken out from the coils 5-3 and 5-4 respectively in order to provide the electric power. Moreover, because of the symmetric structure of the revolving field magnet 2, a pair of output lines P1, P2 and two pairs of input lines P3, P4 and P5, P6 can be taken out from the coils. According to the present invention in which the revolving field magnet 2 is formed of a permanent magnet, if its N pole is located at the position of 180 degrees while its S pole is located at the position of zero degree, the coils 5-3 and 5-4 wound around the first and the second induction electromagnets 5-1 and 5-2 are magnetized by switching power supply applied to the input lines P3 and P4.

Figure 2:
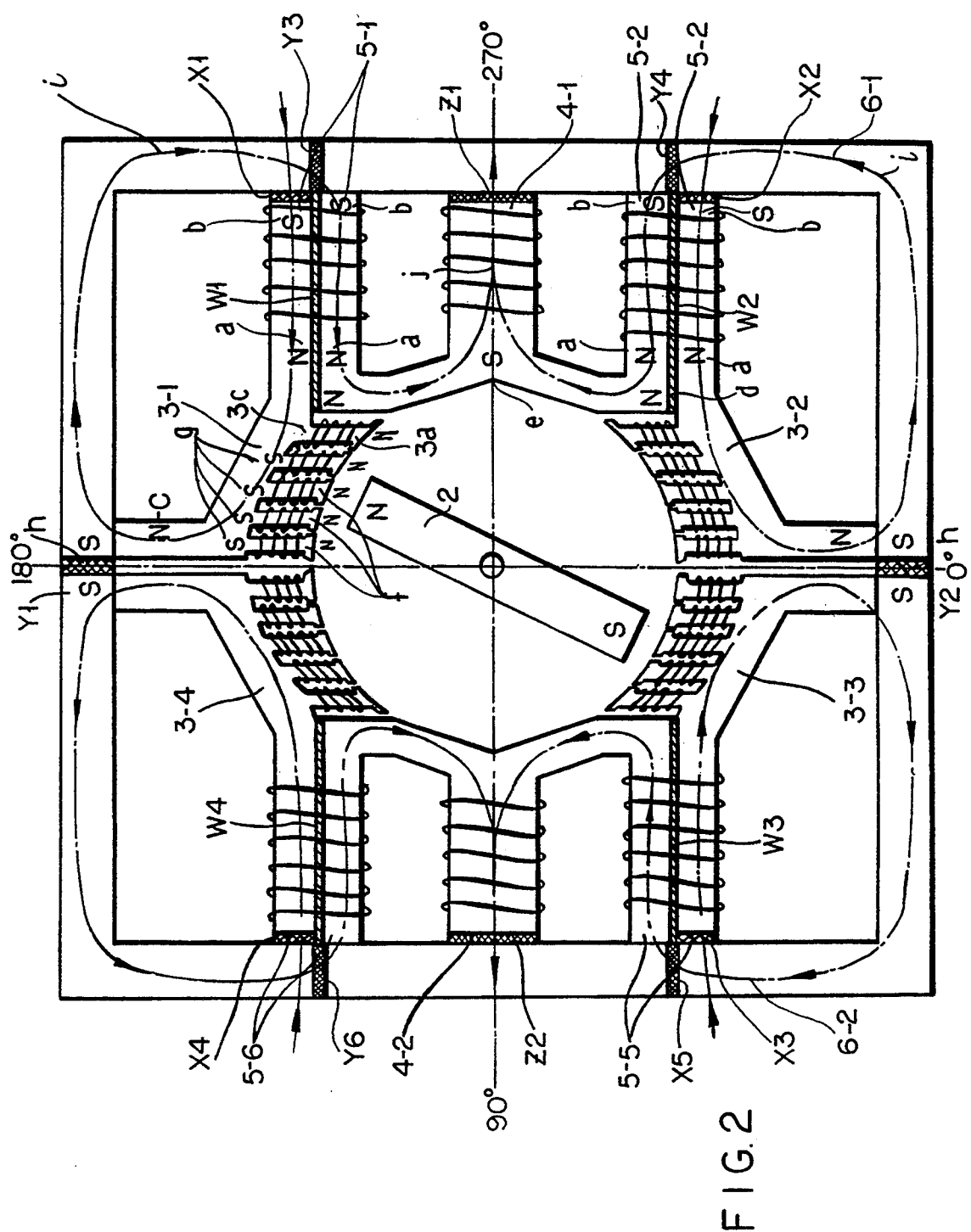
FIG. 2 a plan view of magnetic flow generated in the magnetic circuit of the rotator according to the present invention.

A magnetic field to be generated by the induction electromagnets 5-1 and 5-2 is shown in FIG. 2. In FIG. 2, the flow of the magnetic field is generated in the rotator of the present invention as shown in FIG. 1. When the current flows through the coils 5-3 and 5-4 in the same direction each other, the N pole is formed around the center portions "a" of the magnetic pole sides by the law of the right-handed screw, while the S pole is formed around the center portions "b" of the magnetic pole sides.

The N pole is then formed around the portion "c" of the magnetic pole side of the first induction electromagnet 5-1, and the N pole is also formed around the center portions "d" of the magnetic pole sides of the induction electromagnets 5-1 and 5-2 for circulating the magnetic flux which are connected to the armatures 4 for generating the electric power. And, around the center portion "e" of the magnetic pole sides of the armatures 4 for generating electric power, which is formed into one body with the induction electromagnets 5-1 and 5-2, the S pole is formed around the center portions "d" as the opposite polarity of the N pole.

On the other hand, when the N pole is formed around the center portion "c" of the magnetic pole side of the first induction electromagnet 5-1 formed of one body with the armature 3-1 for generating electric power, the switching power is supplied to the coil 3c wound around the slots 3a and 3b through terminals P11 and P12 as shown in FIG. 1. Then the N pole is induced to the center portions "f" of the slots 3a and 3b of the armature 3-1 for generating the mechanical power and the S pole is induced to the positions "g", so the revolving field magnet 2 is repulsed by the same polarity with the induced pole at the center portions "f" of the sides.

Thus, the revolving field magnet 2 is rotated by the repulsive force of the first armature 3-1 for generating the mechanical power and the attractive force of the first armature 4-1 for generating the electric power due to the induced S pole around the portion "e" of the magnetic pole side of the armature 4-1 for generating the electric power.

At this time, the third armature 3-3 which is shown at the left side of the drawing generates the repulsive force to the revolving field magnet 2 and the second armature 4-2 for generating the electric power generates the attractive force so that the revolving field magnet 2 rotates around the axis 1. In other words, we can obtain the mechanical power by applying the repulsive and attractive force to the revolving field magnet 2 with the switching power supply to the coil 3c wound around the first and the third armatures 3-1 and 3-3 first, and next to a second and fourth armatures 3-2 and 3-4. Also, the revolving field magnet 2 can be rotated by providing the switching power supply to the first, the second, the third and the fourth armatures 3-1, 3-2, 3-3 and 3-4 in sequence order for a constant duration.

Hereinafter, the process for generating the electric energy by the rotation of the revolving field magnet 2 will be described.

If AC power is applied to the input lines P3 and P4 and the coil 5-3 wound around the first induction electromagnet 5-1 for circulating the magnetic flux is magnetized, then the N pole is formed around the center portions "a" of the magnetic pole side of the first induction electromagnetic 5-1, while the S pole is formed around the portions "b". Thus, the S pole is induced around the portions "h" of the magnetic pole side of the circulation conductor 6-1, and the induced magnetic flux passes the center portions "i" and circulates through the induction electromagnetic 5-1 again since the magnetic flux flows from the N pole toward the S pole.

Finally, all the magnetic flux to be circulated flows concentrically toward the center portion "j" of the magnetic pole side of the first induction armature 4-3 in the direction as shown by the arrow and the revolving field magnet 2 rotates so that the magnetic field of the N pole of the revolving field magnet 2 flows toward the S pole of the magnetic field around the center portion "e" of the magnetic pole side of the armature 4-3. Thus, the electromotive force is generated since all the magnetic flux flows concentraically toward the portion "j" of the armature 4-1 and crosses the coil 4-3 vertically.

Moreover, if the S pole around the portion "e" of the magnetic pole sides of the armatures forms the high magnetic field density, the rotation of the revolving field magnet 2 can be interrupted. Thus, the magnetic flux toward the S pole around the portion "e" can be reduced arbitrarily by adjusting gabs Z1 and Z2 at the rear of the magnetic pole of the armature 4-1. Therefore, when the electromotive force is generated at the first armature 4-1, the electromotive force of the opposite direction is also generated at the second armature 4-2, so that the current due to the electromotive force flows through the output line P2 of the coils 4-3 and 4-4.

In summary, the coils 5-3 and 5-4 wound around the induction electromagnets 5-1 and 5-2 are applied for a primary coil of a transformer, while the coils 4-3 and 4-4 of the first and the second armatures 4-1 and 4-2 are applied for a the secondary coil of the transformer, since the magnetic flux flows through the first and second induction electromagnets 5-1 and 5-2. Thus, the induced current is able to flow and then a certain amount of the flux due to the induced current is supplied additionally when the revolving field magnet 2 rotates. Therefore, we can obtain a considerable amount of the electromotive force and take out the electric power from the output coil lines P1 and P2.

Figure 3A:
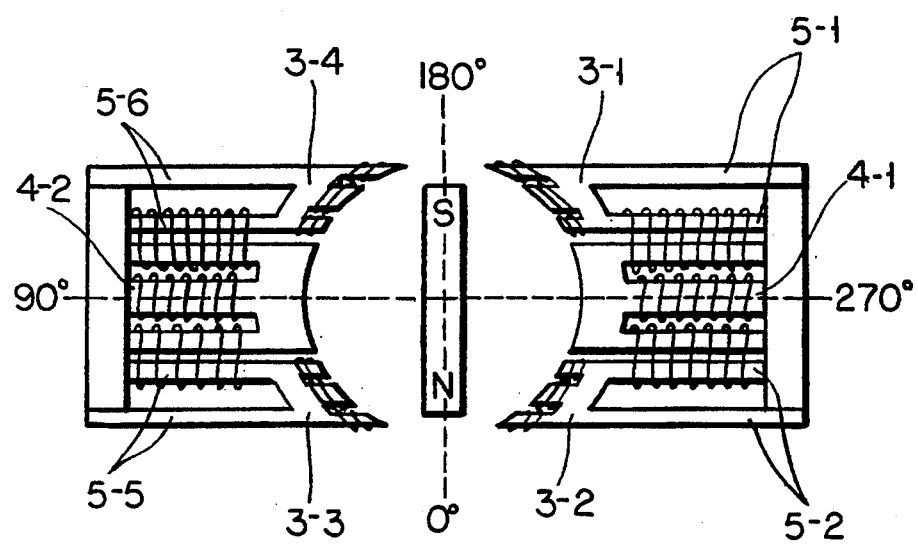
FIG. 3(A) and (B) are other embodiments of the rotator according to the present invention.

FIGS. 3(A) and (B) show a diagram of driving state of the rotator according to embodiment of the modified structures of the electromagnets 5 and the circulation conductors 6 for the circulating the magnetic flux which are included in the magnetic flux induction means.

Figure 3B:
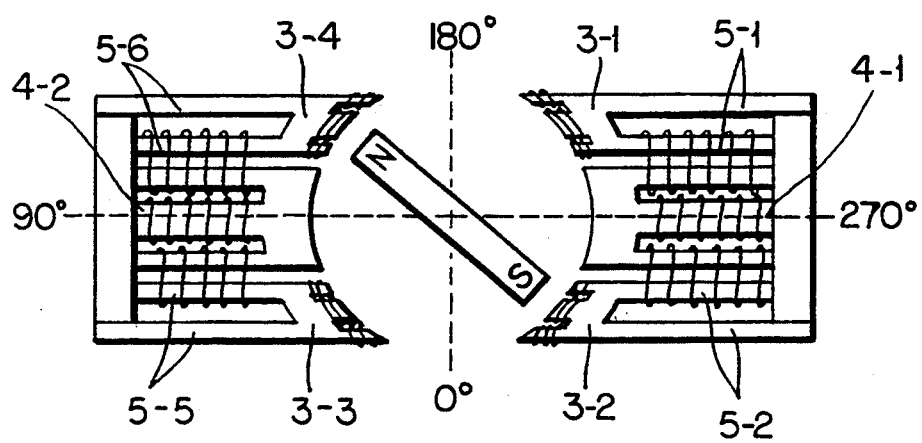

In FIG. 3, the basic structures of the first, the second, the third and the fourth armatures 3-1, 3-2, 3-3 and 3-4 for generating the mechanical power, the first and the second armatures 4-1 and 4-2 for generating the electric power, the first and the second induction electromagnets 5-1 and 5-2, and the circulation conductors 6-1 and 6-2 are formed of similar structure in general.

Figure 4:
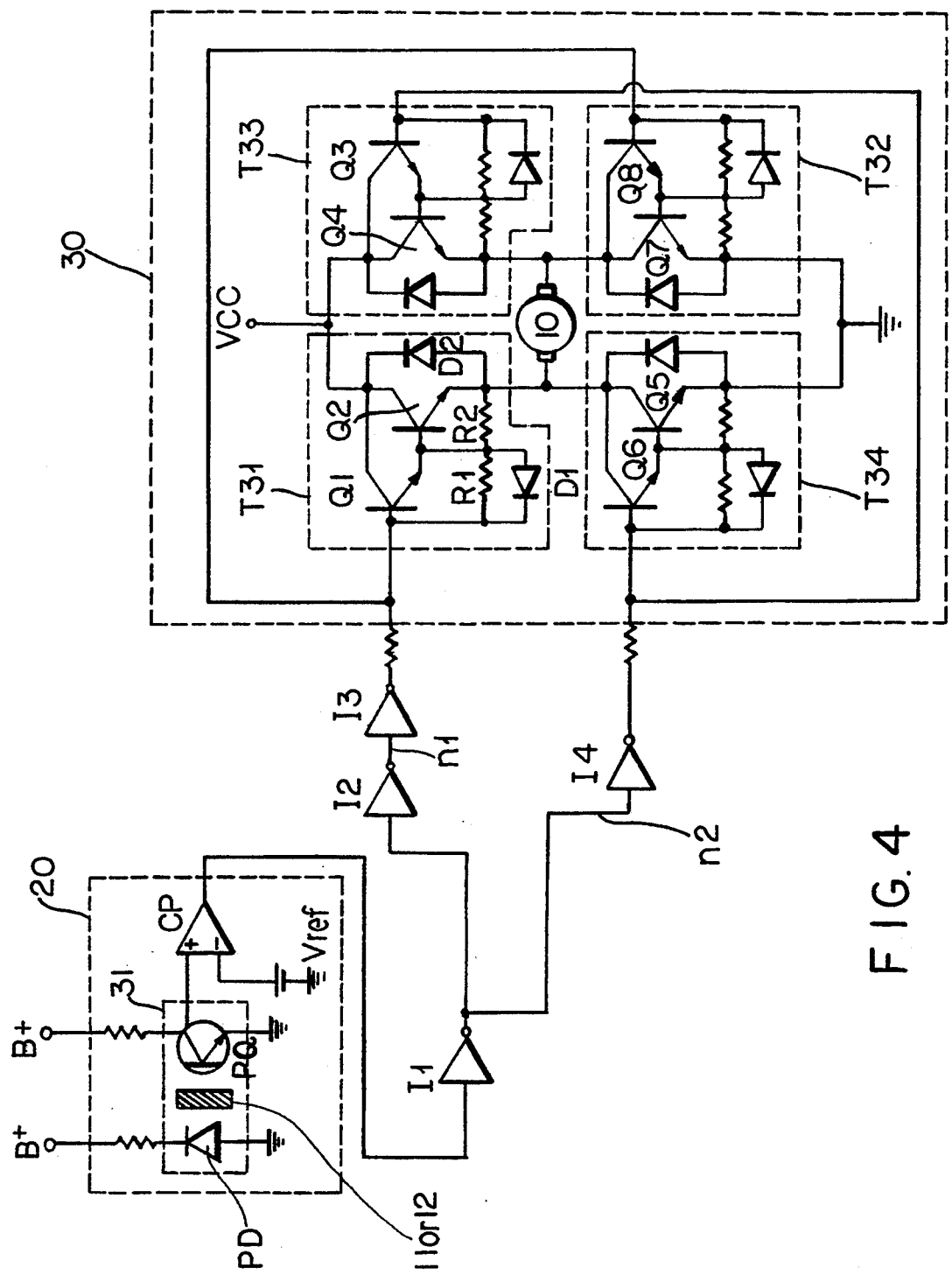
FIG. 4 is a diagram of a switching circuit according to the present invention.

In the operation, when the N pole of the revolving field magnet 2 is located at the position of zero degree while its S pole is located at the position of 180 degree, the phase of the revolving field magnet 2 detected by a phase detector (described hereinafter0 is provided to a switching power supply circuit 30, as shown in FIG. 4, and the switching power supply circuit 30 provides the electric power to the armature 3 and the magnetic flux circulation induction electromagnets 5.

For example, when the S pole is first induced to the third armature 3-1 located at the left and lower side, then the N pole is induced to the third induction electromagnet 5-5 located at the left and lower side as shown in FIG. 3(A). Next, when the N pole is induced to the first armature 3-1 for generating mechanical power while the S pole is also induced to the second induction electromagnet 5-2 located at the right and lower side, then the attractive force is provided to the revolving field magnet 2.

On the contrary, when the S pole is induced to the fourth armature 3-4 located at the left and upper side while the N pole is induced to the second armature 3-2 located at the right and lower side, then the repulsive force is provided to the revolving field magnet 2 so as to rotate the revolving field magnet 2. Moreover, the third induction electromagnet 5-5 induces the N pole to the second armature 4-2 at the left side and the magnetic flux of the N pole of the revolving field magnet 2 flows toward the S pole of the second armature 4-2. Also, the S pole is induced to the first armature 4-1 from the second induction electromagnet 5-2 and the revolving field magnet 2 at the same time. Thus, the coil 4-4 wound around the left armature 4-2 and the coil 4-3 wound around the right armature 4-1 traverse the magnetic flux so as to generate electromotive force.

On the other hand, if the N pole of the revolving field magnet 2 is induced to the position of 95 degrees while its S pole is induced to the position of 275 degrees due to the rotation inertia, a phase detector 20 detects the phase of the revolving field magnet 2 and the switching power supply circuit 30 converts the electric polarity of each armature, induction electromagnet and the like to rotate the revolving field magnet 2 continuously. Thus, the N pole is induced to the third armature 3-3 located at the left and lower side, while the S pole is induced to the fourth armature 3-4 located at the left and upper side. On the contrary, the N pole is induced to the second armature 3-2, while the S pole is induced to the first armature 3-1, so the revolving field magnet 2 can rotate continuously. As above, the magnetic polarity of the first and the second induction electromagnets 4-1 and 4-2 is changed by every phase of 180 degrees of the revolving field magnet 2 and that of the armatures 3 is also changed by every phase of 90 degrees. And, the angles are adjustable. The switching power supply circuit 30 is necessary to change the phase of the revolving field magnet 2 as shown in FIG. 4.

FIG. 4 shows a diagram of an example of the switching power supply circuit 30 which supplies the switching power to the rotator according the present invention.

The circuit changes the polarity by every phase of 180 degrees of the revolving field magnet 2. In this circuit, the revolving field magnet phase detector 20 for detecting the phase of the revolving field magnet 2 includes a photosensor 31 comprising a photodiode PD and a phototransistor PQ. The first and the second phase-detecting plates 11 and 12 (shown in FIG. 4) connected to the axis 1 of the revolving field magnet 2 are located between the photodiode PD and the phototransistor PQ for detecting rotated angles.

An output terminal of the phototransistor PQ is connected to a comparator CP so that one output of the comparator CP is compared with a reference voltage and another output of the comparator CP is provided to different nodes n1 and n2 through inverters I1 and I2. The output of the node n1 is also connected to the switching power supply circuit 30 through an inverter I3, while the output of the node n2 is connected to the switching power supply circuit 30 through an inverter I4.

The switching power supply circuit 30 comprises a first, a second a third and a fourth switching parts, T31, T32, T33 and T34 for providing the electric power to the rotator 10, the switching parts T33 and T34 being driven reversly in relation to the switching part T31 and T32. In other words, when T31 and T32 are ON then the switching parts T33 and T34 become OFF, while when the switching parts T31 and T32 are OFF, then the switching parts T33 and T34 become OFF. Each of the switching parts T31, T32 and T33, T34 has the same configuration, in which the first switching part T31 comprises darlington transistors Q1 and Q2, voltage-dividing resistors R1 and R2, and diodes D1 and D2 to prevent the switching voltage from reverse.

The transistors Q1 and Q2 of the first switching part T31 and transistors Q7 and Q8 of the second switching part T32 are turned on at the same time. By the same way, transistors Q3 and Q4 in the switching part T33 and transistors Q5 and Q6 in the switching part T34 are also turned on at the same time so that the rotator 10 is supplied with a switching pulse voltage of which phase is 180 degrees.

Thus, the switching power supply circuit 30 changes the direction of the current applied to the induction electromagnets 5-1 and 5-2 whenever the revolving field magnet 2 changes by every 180 degrees.

Also, whenever the revolving field magnet 2 changes by every 90 degrees, the switching current to be supplied to the first armature 3-1 to the fourth armature 3-4 is provided through the switching power supply circuit 30 in the same manner, since the switching power supply circuit 30 includes the second phase-detecting plate 12 to be sensed in the revolving field magnet phase detector 20 in which a photosensor 31 detects the second phase-detecting plate 12 by every 90 degrees of the revolving field magnet 2.

The comparator CP of the revolving field magnet phase detector 20 in the switching power supply circuit 30 compares the reference voltage vref applied to an inverting input terminal (−) with an output voltage of the photosensor 31 applied to a noninverting input terminal (+).

The photosensor 31 detects the rotated angle of the first phase-detecting plate 11 connected to the axis 1 of the revolving field magnet 2 (shown in FIG. 4), so as to provide a low level signal to the noninverting terminal (+) of the comparator CP and turn on the phototransistor PQ if the light of the photodiode PD is transmitted, while a high level signal (B+) is provided when the light is not transmitted.

In case that an output of the comparator CP is the low level, the output becomes high level after passing through the inverters I1, I2 and I3. This high level signal makes the first and the second switching parts T31 and T32 turn on so that the current flows to the rotator 10. Furthermore, the high level signal applied to the first switching part 31 makes the transistors Q1 and Q2 turn on and the diodes D1 and D2 prevent the switching voltage from reversing. Moreover, the high level signal after passing through the only inverter I1 becomes low level again through the inverter I4 and the low level signal is applied to the third and the fourth switching parts T33 and T34, thereby to keep them turn off.

On the other hand, when the output of the comparator CP is the high level, the high level signal which passed through the inverters I1 and I2 becomes the low level after passing through the inverter I3 to be applied to the first and the second switching parts T31 and T32 so that the switching parts T31 and T32 keep the "turn off" state. Moreover, the high level signal passed through the inverters I1 and I4 is applied to the third and the fourth switching parts T33 and T34 so that they are turned on and the current flows to the rotator 10. The current has an opposite direction in relation to that of the first and the second switching part T31 and T32 which are turned on.

Figure 5:
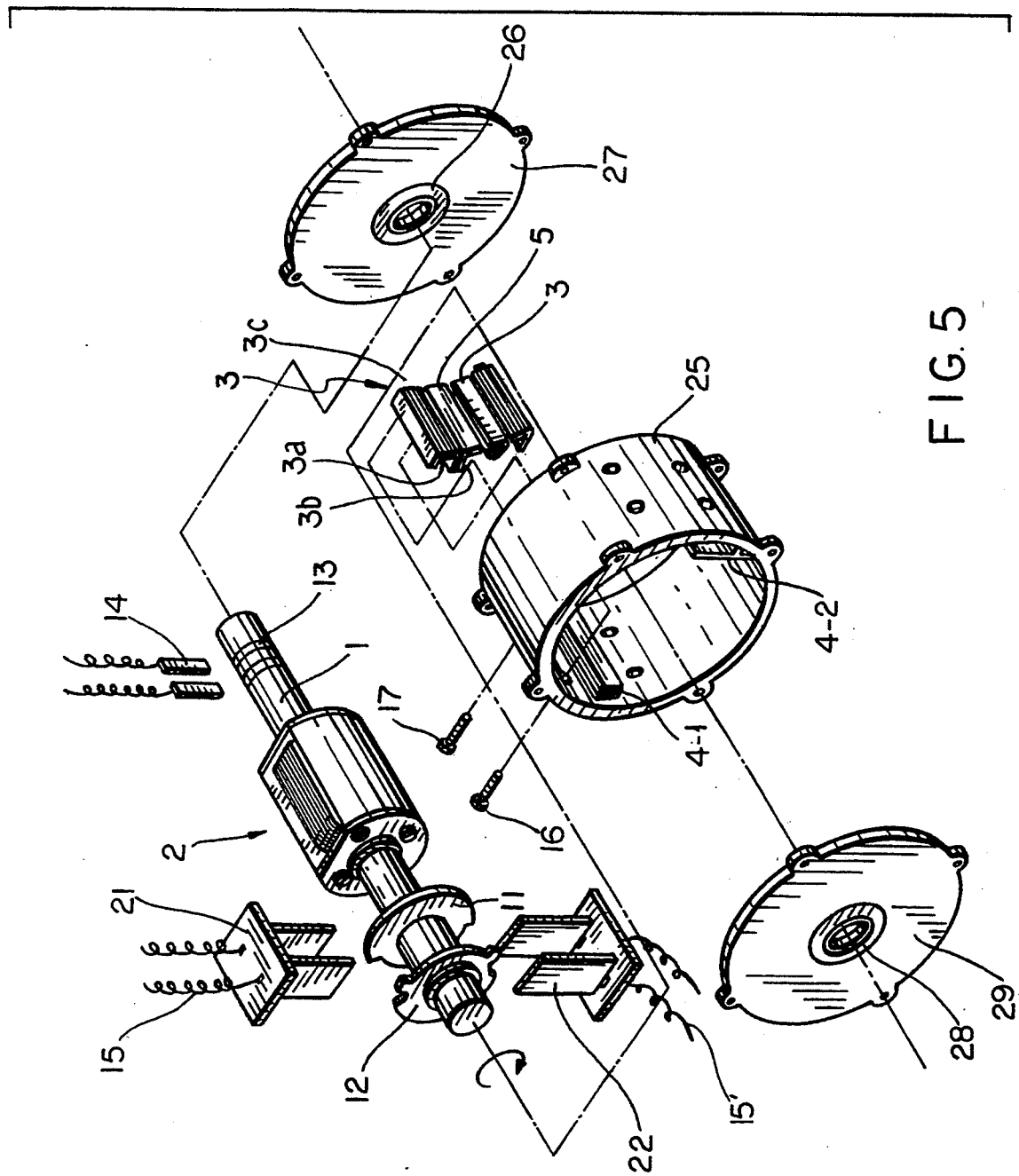
FIG. 5 is an exploded perspective view of the rotator according to the present invention.

In case that the phase detector 20 detects the angle of the first-phase detecting plate 11 as shown in FIG. 5, a square-wave current which is switched by every 180 degrees of the revolving field magnet 2 must be provided in turns to the two pairs of input lines P3, P4 and P5, P6 in the rotator 10. And, in case that the phase detector 20 is used to detect the angle of the second phase-detecting plate 12, the square-wave current is provided in sequence order to the first armature 3-1 to the fourth armature 3-4 by every 90 degrees of the revolving field magnet 2.

FIG. 5 shows an embodiment of the rotator according to the present invention.

The revolving field magnet 2 is formed by the electromagnet wound with coils or a permanent magnet and provided with a hole in its center for inserting the rotation axis 1. In addition, the first and the second phase detecting plates 11 and 12 are attached to the rotation axis 1. The first phase-detecting plate 11 controls the direction of the current applied to the coils 4-3 and 4-4 wound around the first and the second induction electromagnets 4-1 and 4-4 for generating the N and S poles. The second phase-detecting plate 12 controls the supply of the current through the coil 3c wound around the slots 3a of the first armature 3-1 to the fourth armature 3-4. Thus, the peripheral of the first and the second phase detecting plates 11 and 12 is cut as the desired angle so as to control the transmission time of the photosensor 31.

Also, a first and a second photosensor frames 21 and 22 are attached to both left and right sides of the first and the second phase-detecting plates 11 and 12 respectively, thereto the photosenser 31 is attached. The photosensor frames 21 and 22 are formed of " " shape and provided with wires 15 and 15′ for supplying the electric power. Thus, the rotation-phase detector 20 includes the first and the second phase-detecting plates 11 and 21, the first and the second photosensor frames 12 and 22, and the photosensor 31 to be attached to the photosensor frames 21 and 22. Also, slip rings 13 are formed on peripheral of the axis 1 and connected to brushes 14 so that the direction of the current provided to the coils to be magnetized in the revolving field magnet 2 can be controlled.

The armatures 4 for generating the electric power are divided into the first armature 4-1 and the second armature 4-2, and each armature 4-1 and 4-2 is fixed inside a cylindrical field plate 25 by screws 16 and 17. The coils for generating the electric power are wound around the armatures 4-1 and 4-2.

The magnetic pole sides of the armatures 3 for generating the mechanical power are made of insulated conductors in the form of slots 3a and 3b wound with the coil 3c, and fixed on the inside of the cylindrical field plate 25 by screw. The armatures 3 for generating the mechanical power include the first armature 3-1 to the fourth armature 3-4 to be arranged in cylindrical field plate 25 symmetrically. The induction electromagnets 5 are made of the ferromagnetic material in the same manner with the armatures 3 and 4 as shown in FIG. 1 and fixed inside of the cylindrical field plate 25. The cylindrical field plate 25 is to be the circulation conductor 6 in FIG. 1.

As above, after the armatures 3 for generating the mechanical power, the armatures 4 for generating the electric power and the induction electromagnets 5 for circulating the magnetic flux are fixed inside the cylindrical field plate 25, the revolving field magnet 2 is inserted into its center hole and fixed together with the rotation-phase detector 20. Housings 27 and 29 provided with bearings 26 and 28 are joined to both left and right sides of the rotation axis 1 for fixing the position of the revolving field magnet 2, and then the rotator 10 is completed by screwing on.

When the electric power is provided to the rotator 10, the phase-detected signals is provided to the switching power supply circuit 30 in FIG. 4 by the first and the second phase-detecting plates 11 and 12 which rotate along with the revolving field magnet 2. As mentioned above, magnetic fields are formed around the armatures 3 for generating the mechanical power and the induction electromagnets 5 according to the switching power supply circuit 30 correspondingly to the position of the revolving field magnet 2. This magnetic field gives the attractive and repulsive force to the revolving field magnet 2 for rotating around the axis 1 so as to obtain the mechanical power. If both flux through the induction electromagnets 5 and the revolving field magnet 2 are induced toward the armatures 4 for generating the electric power to cross the wound coils 5-3 and 5-4 vertically so as to generate the electromotive force, the mechanical power and the electric power can be obtained at the same time.

According to the present invention, which has improved the disadvantage of the conventional rotator which consumes constant energy to obtain the necessary energy, the 20 percent of the magnetic flux of the field magnet can be recovered to the electric energy, even though the input-to-output recovery ratio of energy is not 1 to 1. So that the external energy supply can be largely reduced due to the recovered energy. The rotator according the the present invention can be used in various fields such as the engines of the electric motorcars, ships, airplanes and heavy equipment, motors of controllers, various medical instruments, robot controllers, and magnet brakes.

In summary, the current position of the revolving field magnet 2 is detected by the phase-detector 20 for generating the magnetic field to rotate the revolving field magnet 2, and then the electric power is provided in a selected direction to the one or more induction electromagnets 5 and one or more armatures 3 for generating the mechanical power. Therefore, the current is provided to the first armature 3-1 to the forth armature 3-4 in sequence order and the mechanical power is obtained by the attractive or repulsive forces of the revolving field magnet 2. Also, the magnetic flux caused by the current flowing through the electromagnets 5-1, 5-2, 5-5 and 5-6 and the magnetic flux generated at the revolving field magnet 2 are concentrated toward the armatures 4 for generating the electric power to generate the electromotive force.

The first electromagnet 5-1 to the fourth electromagnet 5-6 are provided with slits X1-X4 to increase the efficiency of the magnetic flux, as shown in FIG. 2, thereby for generating the magnetic reluctance for the induced magnetic flux to circulate in a predetermined direction, as shown by the arrows, in the first and the second circulation conductors 6-1 and 6-2. In the same manner, the first and the second circulation conductors 6-1 and 6-2 is provided with slits Y1 to Y5. These slits X1-X4 and Y1-Y5 are formed by cutting the electromagnets and the conductors in a constant distance. The efficiency of the slits can be improved by inserting the antiferromagnetic material or the diamagnetic material. Moreover, the induction electromagnets 5 are provided with slits Z1 and Z2 for improving the circulation efficiency of the magnetic flux, since the armatures 3 and 4 for generating the mechanical power and the electric power and the induction electromagnets are made of the ferromagnetic material to induce the magnetic field strongly according to the direction of the current.

If the silicon steel, soft ferrite, permalloy, amorphous, etc., are used as the ferromagnetic materials, the strong magnetic field can be induced due to their high magnetic permeability of the core.

In case that the S pole around the center portion "e" of the armatures 4 has the strong magnetic flux, the slits Z1 and Z2 can also be formed at the rear of the armatures 4 thereby for reducing the magnetic flux of the center portion "e" arbitrarily since the rotating motion of the revolving field magnet 2 is interrupted.

The present invention described hereinabove has characteristics, in which consumption of the external electric energy can be minimized by generating the mechanical power and the electric power at the same time and applying the generated electric power to the rotator again in such a manner that the magnetic field to rotate revolving field magnet is formed by switching power supply at the one or more armatures for generating the mechanical power and both of the magnetic flux of the revolving field magnet and the magnetic flux of the induction electromagnets and the circulation conductors are supplied to the armatures for generating the electric power so that the rotating mechanical power and the electric power are generated at the same time.

In the present invention, the rotator has been described in 2 poles and 4 phases configuration, it can be, however, applied in 2 pole and 3 phases or multi-pole configuration in the same manner.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A magnetic circuit of a rotating apparatus for simultaneously generating an electric power and a mechanical power, comprising:

a revolving field magnet (2) installed on an axis therein, rotated by the attractive and repulsive forces of a magnetic field;

means (3) for generating mechanical power to apply a rotating magnetic field to said revolving field magnet (2), said means including a plurality of armatures (3-1, 3-2, 3-3, 3-4) wound with coils (3c) and a plurality of conductors (3a, 3b) of slot-type at the magnetic pole sides thereof for generating the mechanical power;

means (4) for generating electric power formed by conductors, said means including a plurality of armatures (4-1, 4-2) to receive a magnetic flux generated when said revolving field magnet (2) rotates, and coils wound around said armatures (4-1, 4-2) for generating the electric power; and magnetic flux induction means including an induction electromagnet (5) for controlling the flow of a magnetic flux according to the position of said revolving field magnet (2) and a circulation conductor (6) for circulating an inducted flux by said induction electromagnet (5).

2. A magnetic circuit according to claim 1, wherein said revolving field magnet (2) is formed by a permanent magnet or an electromagnet being wound with coils to be magnetized.

3. A magnetic circuit according to claim 1, wherein said induction electromagnet (5) includes first to fourth electromagnets (5-1, 5-2, 5-5, 5-6) and are formed to be attached together to said plurality of armatures for generating mechanical and electric powers are formed of a single conductor.

4. A magnetic circuit according to claim 1, wherein said means (4) for generating an electric power includes a superconductor alloy formed at the magnetic flux receiving portion, and ferromagnetic materials and coils for generating an electric power.

5. A magnetic circuit according to claim 3, wherein said first to fourth induction electromagnets (5-1, 5-2, 5-5, 5-6) in the magnetic flux induction means (5) are formed of one of the shape of bar, triangle, circle, prominence and depression, T, M, or Y-type.

6. A magnetic circuit according to claim 1, wherein said first to fourth induction electromagnets (5-1, 5-2, 5-5, 5-6) include a plurality of slits (X1, X2, X3, X4, W1, W2, W3, W4) in order to appropriately reduce or increase the strength of magnetic flux as necessary.

7. A magnetic circuit according to claim 1, wherein said circulation conductors (6-1, 6-2) include a plurality of slits (Y3, Y4, Y5, Y6) for magnetic reluctance at the predetermined portion.

8. A magnetic circuit of a rotating apparatus for generating an electric power and a mechanical power, comprising:
   a revolving field magnet (2) for rotating by attractive and repulsive forces of a magnetic field;
   means (3) for generating mechanical power to apply a rotating magnetic field to said revolving field magnet (2), including one or more armatures (3-1, 3-2, 3-3, 3-4) wound with coils (3c) and a plurality of conductors (3a, 3b) of slot-type at the magnetic poles thereof for generating the mechanical power;
   means (4) for generating electric power formed with conductors (3a, 3b) including one or more armatures (4) for generating the electric power to receive a magnetic flux generated when said revolving field magnet (2) rotates, and coils (3c) wound around said armatures (4-1, 4-2) for generating the electric power;
   magnetic flux induction means including one or more induction electromagnets (5) for controlling the flow of a magnetic flux according to the position of said revolving field magnet (2) and a circulation conductor (6) for circulating an inducted flux by said induction electromagnets (5); and
   phase detector (20) for providing switching power supply to said means (3) for generating mechanical power and to said magnetic circulation induction means by detecting the 9. A magnetic circuit according to claim 8, wherein said phase detector comprises:
   a photosensor (31) including a photodiode (PD) and a phototransistor (PQ);
   a comparator (CP) for comparing an output voltage of said photosensor (31) with a reference voltage (Vref); and
   a circuit (30) for providing the switching power supply to an output of said comparator (CP).

10. A magnetic circuit of a rotating apparatus for generating electric power and mechanical power, comprising:
   armatures for generating mechanical power provided with slots at their magnetic pole sides and coils (3c) wound around said armatures (3);
   armatures (4) for generating electric power for receiving an induced magnetic flux;
   induction electromagnets (5) for controlling the magnetic flux according to the rotated phase, said armatures (3) for generating mechanical power,
   said armatures (3) for generating mechanical power, said armatures (4) for generating the electric power and said induction electromagnets (5) being fixed at a cylindrical metal plate (25);
   a revolving field magnet (2) fixed at a rotation axis;
   first and second phase detecting plates (11, 21) fixed at a rotating axis (1); and
   first and second photosensor frames (12, 22) fixed between left and right housings (27, 29) with bearing (26, 28) to be inserted into the cylindrical metal plate (25).

11. A magnetic circuit according to claim 10, wherein said cylindrical metal plate (25) is formed by circulation conductor (6) for magnetic flux.

12. A rotator according to claim 10, wherein the rotator for generating electric power and mechanical power comprises:
   a revolving field magnet (2) formed by an electromagnet wound with coils (3c);
   slip rings (13) formed on the rotation axis (1) for changing the magnetic polarity of said revolving field magnet (2); and
   brushes (14) to be connected to said slip rings (13) for providing electric current.

* * * * *